United States Patent
Takagi (10) Patent No.: US 11,569,609 B2
(45) Date of Patent: Jan. 31, 2023

(54) CABLE CLAMP AND CHARGING CONNECTOR

(71) Applicant: JAPAN AVIATION ELECTRONICS INDUSTRY, LIMITED, Tokyo (JP)

(72) Inventor: Youhei Takagi, Irvine, CA (US)

(73) Assignee: Japan Aviation Electronics Industry, Limited, Tokyo (JP)

( * ) Notice: Subject to any disclaimer, the term of this patent is extended or adjusted under 35 U.S.C. 154(b) by 160 days.

(21) Appl. No.: 17/123,480

(22) Filed: Dec. 16, 2020

(65) Prior Publication Data

US 2022/0029351 A1 Jan. 27, 2022

Related U.S. Application Data

(60) Provisional application No. 63/054,949, filed on Jul. 22, 2020.

(51) Int. Cl.
*H01R 13/58* (2006.01)
*H02J 7/00* (2006.01)

(52) U.S. Cl.
CPC ........ *H01R 13/5825* (2013.01); *H02J 7/0042* (2013.01)

(58) Field of Classification Search
CPC ........................... H01R 2201/26; B60L 53/16
See application file for complete search history.

(56) References Cited

U.S. PATENT DOCUMENTS

| | | | |
|---|---|---|---|
| 8,597,046 B2 | 12/2013 | Osawa et al. | |
| 9,601,862 B2 * | 3/2017 | Fukushima | H01R 13/516 |
| 2012/0238130 A1 * | 9/2012 | Osawa | H01R 13/5825 |
| | | | 439/460 |
| 2016/0134032 A1 * | 5/2016 | Hall | H01R 43/0207 |
| | | | 439/578 |
| 2017/0271807 A1 * | 9/2017 | Lane | H01R 13/506 |
| 2019/0131747 A1 * | 5/2019 | Nakamura | H01R 13/6581 |

FOREIGN PATENT DOCUMENTS

| | | |
|---|---|---|
| JP | 2011-233440 A | 11/2011 |
| JP | 2012-195214 A | 10/2012 |
| JP | 2019-204650 A | 11/2019 |

OTHER PUBLICATIONS

U.S. Appl. No. 62/977,442, filed Feb. 17, 2020 (provisional application as filed in Japanese on Feb. 17, 2020, along with the English translation filed on Jul. 6, 2020).

* cited by examiner

*Primary Examiner* — Michael C Zarroli
(74) *Attorney, Agent, or Firm* — Collard & Roe, P.C.

(57) ABSTRACT

A cable clamp has first and second metal plate members, each with two fixed portions, front and rear plate portions, and a clamp portion. The fixed portions are separated from each other in a first direction perpendicular to a front-rear direction. The front plate portion couples the fixed portions to each other. The rear plate portion is rearward of and apart from the front plate portion and couples the fixed portions to each other. The clamp portion is on the front or rear plate portions or both. When clamped, in a second direction perpendicular to the front-rear and first directions, the first member fixed portions are fixed to the second member fixed portions, respectively, the cable, in the second direction, is between the first and second member front plate portions and between the first and second member rear plate portions, and the clamp portion is pressed against the cable.

8 Claims, 10 Drawing Sheets

CABLE CLAMP AND CHARGING CONNECTOR

CROSS REFERENCE TO RELATED APPLICATIONS

This application is a non-provisional application that hereby claims priority under 35 U.S.C. 119(e) from U.S. Provisional Patent Application Ser. No. 63/054,949 filed on Jul. 22, 2020, the disclosure of which is incorporated herein by reference.

BACKGROUND ART

This invention relates to a cable clamp, particularly to a cable clamp used in a charging connector.

Patent Document 1 discloses an example of a charging connector.

Figure 18:
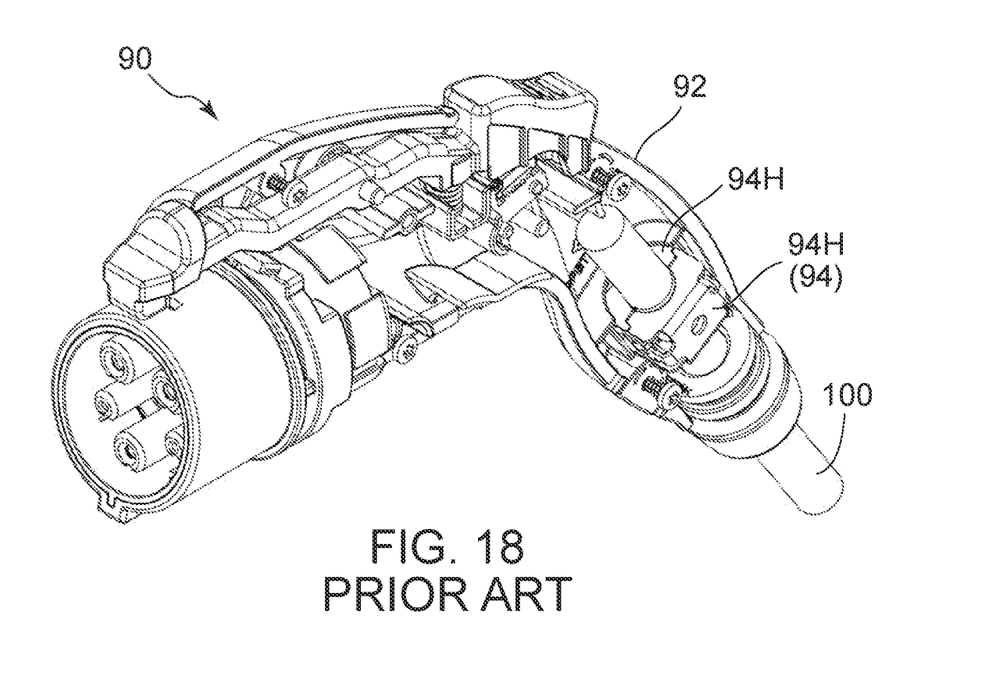
FIG. 18 is a perspective view showing a charging connector disclosed in Patent Document 1. In the figure, a cover housing is detached.

As shown in FIG. 18, a charging connector 90 disclosed in Patent Document 1 is attached to an end of an electrical wire (a cable) 100. The charging connector 90 is provided with a housing 92 and a metal clip (a cable cramp) 94 which holds the electrical wire 100. The metal clip 94 is consists of a pair of half bodies 94H and 94H.

Figure 19:
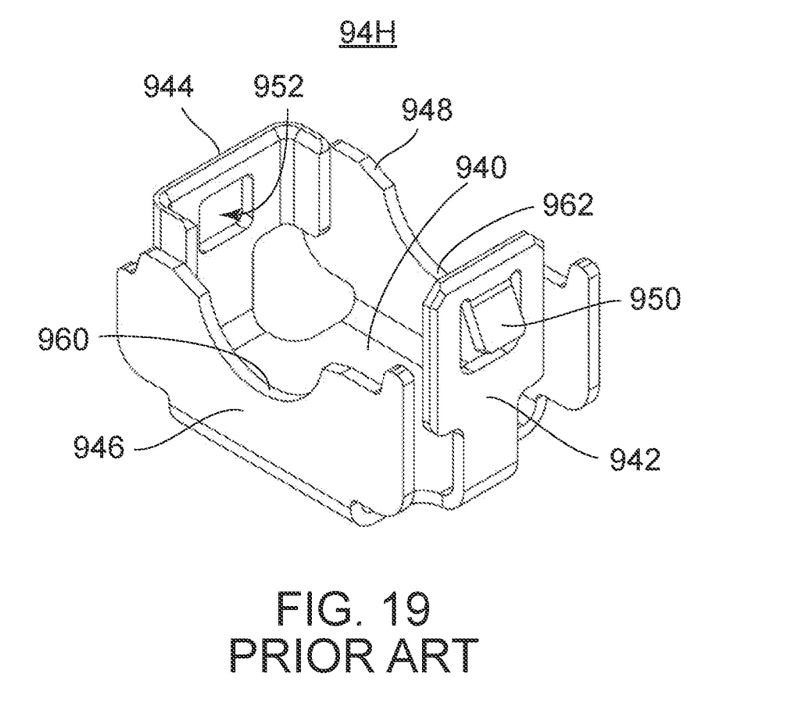
FIG. 19 is a perspective view showing a metal clip included in the charging connector of FIG. 18.

As understood from FIG. 19, the half body 94H is made of a metal plate. The half body 94H has a bottom wall 940, a right-side wall 942, a left-side wall 944, a front wall 946 and a rear wall 948. The right-side wall 942, the left-side wall 944, the front wall 946 and the rear wall 948 extend from four edges of the bottom wall 940 in the same direction, respectively.

As shown in FIG. 19, the right-side wall 942 is provided with an engagement piece 950, and the left-side wall 944 is provided with an engagement hole 952. The front wall 946 and the rear wall 948 are provided with curved portions 960 and 962, respectively.

As understood from FIGS. 18 and 19, the half bodies 94H of the pair are combined with each other and hold the electrical wire 100. Then, the curved portions 960 and 962 of one of the half bodies 94H and the curved portions 960 and 962 of the other of the half bodies 94H are pressed against the electrical wire 100 and clamp the electrical wire 100. Meanwhile, the engagement piece 950 of one of the half bodies 94H fits in the engagement hole 952 of the other of the half bodies 94H, and the engagement piece 950 of the other of the half bodies 94H fits in the engagement hole 952 of the one of the half bodies 94H. In this way, the half bodies 94H and 94H are fixed to each other and hold the electrical wire 100.

[Patent Document 1] JP 2012-195214 A

In the charging connector 90 disclosed in Patent Document 1, when the metal clip 94 holds the electrical wire 100, the front wall 946 and the rear wall 948 of each of the half bodies 94H are pressed against the electrical wire 100. On that occasion, if at least one of the front walls 946 and the rear walls 948 is deformed in a front-rear direction, there is a possibility that the metal clip 94 cannot be accommodated in the housing 92.

DISCLOSURE OF INVENTION

It is therefore an object of the present invention to provide a cable clamp having a structure which is hard to be deformed.

One aspect of the present invention provides a cable clamp which clamps and holds a cable extending in a front-rear direction in a shell of a connector. The cable clamp comprises a first member and a second member. Each of the first member and the second member is made of a metal plate. Each of the first member and the second member has two fixed portions, a front plate portion, a rear plate portion and a clamp portion. The fixed portions are located apart from each other in a first direction perpendicular to the front-rear direction. The front plate portion couples the fixed portions to each other. The rear plate portion is located rearward of and apart from the front plate portion in the front-rear direction and couples the fixed portions to each other. The clamp portion is provided on at least one of the front plate portion and the rear plate portion. In a clamped state that the cable clamp is clamped on the cable, in a second direction perpendicular to both of the front-rear direction and the first direction, the fixed portions of the first member are fixed to the fixed portions of the second member, respectively. In the clamped state, in the second direction, the cable is located between the front plate portion of the first member and the front plate portion of the second member and between the rear plate portion of the first member and the rear plate portion of the second member. In the clamped state, the clamp portion is pressed against the cable.

Another aspect of the present invention provides a charging connector having a body. The connector comprises the cable cramp mentioned above. The cable clamp is accommodated in the body.

An appreciation of the objectives of the present invention and a more complete understanding of its structure may be had by studying the following description of the preferred embodiment and by referring to the accompanying drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Referring to FIGS. 1 to 4, a charging connector 10 is attached to an end of a cable 60. The cable 60 extends rearward from the charging connector 10. In the present embodiment, a front-rear direction is a Y-direction. A positive Y-direction is directed forward while a negative Y-direction is directed rearward.

As shown in FIGS. 1 to 4, the charging connector 10 is provided with a connector body (a body) 20, a mating portion 30 and a latch lever 32.

As understood form FIGS. 1 to 6, in the present embodiment, the connector body 20 has a base shell 221 and a cover shell 223 which are detachable from each other in a lateral direction perpendicular to the front-rear direction. In the present embodiment, the base shell 221 and the cover shell 223 are fixed to each other by use of a plurality of screws 225 and form a shell 22. In the present embodiment, the lateral direction is an X-direction.

As shown in FIGS. 1 to 4, the base shell 221 and the cover shell 223 define a main portion 24 and a grip portion 26 of the connector body 20. In other words, the connector body 20 has the main portion 24 and the grip portion 26.

Figure 1:
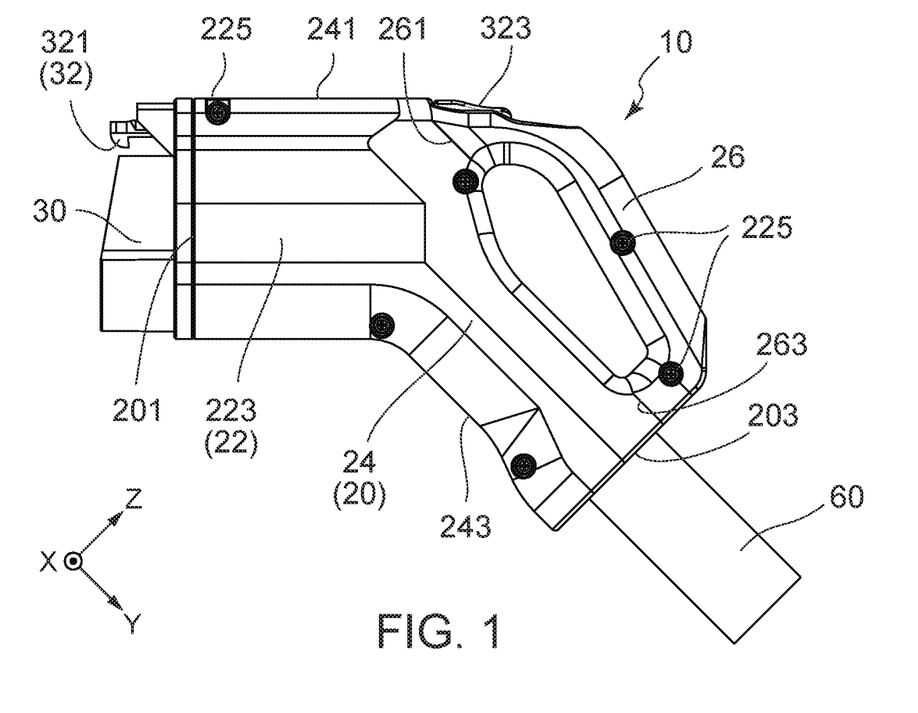
FIG. 1 is a side view showing a charging connector according to an embodiment of the present invention. In the figure, the charging connector is attached to an end of a cable.
Figure 2:
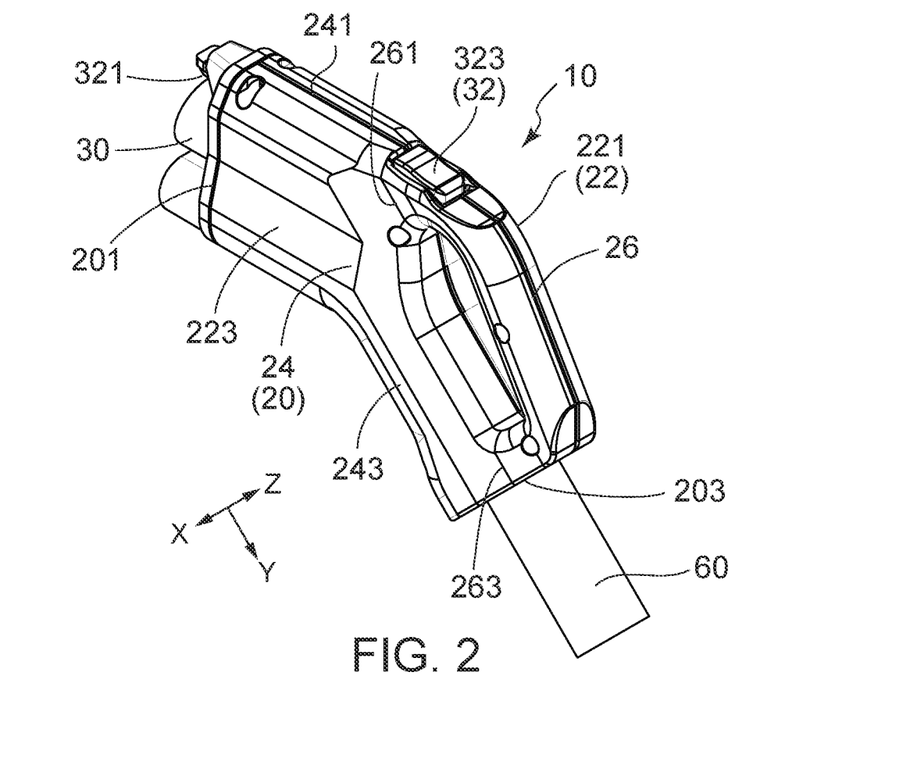
FIG. 2 is an upper, perspective view showing the charging connector of FIG. 1.
Figure 3:
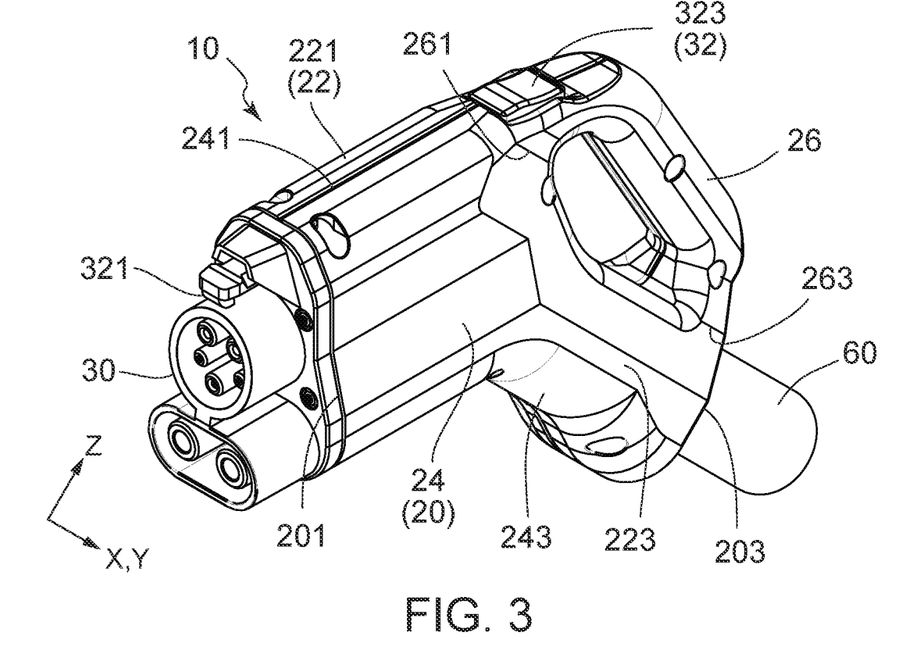
FIG. 3 is a side, perspective view showing the charging connector of FIG. 1.
Figure 4:
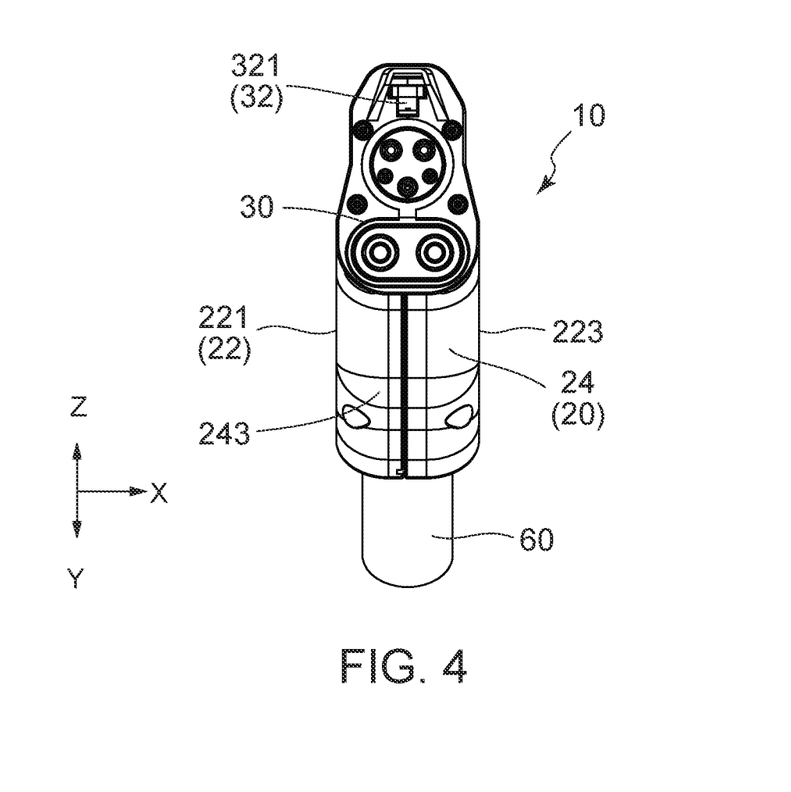
FIG. 4 is a front, perspective view showing the charging connector of FIG. 1.

As shown in FIGS. 1 to 3, the main portion 24 of the connector body 20 has a dogleg shape. In detail, the main portion 24 has a rear portion 243 extending in the front-rear direction and a front portion 241 extending forward-diagonally downward from the rear portion 243. The main portion 24 accommodates the end of the cable 60 when the charging connector 10 is connected to the cable 60. In the present embodiment, an up-down direction is a Z-direction perpendicular to both of the front-rear direction and the lateral direction. A positive Z-direction is directed upward while a negative Z-direction is directed downward.

As shown in FIGS. 1 to 3, the grip portion 26 of the connector body 20 extends approximately in the front-rear direction and has a pair of end portions 261 and 263. Each of the end portions 261 and 263 faces approximately downward. The grip portion 26 is located upward of the rear portion 243 of the main portion 24, and each of the end portions 261 and 263 is connected to the main portion 24. In a plane perpendicular to the front-rear direction, a cross-sectional area of the grip portion 26 is smaller than that of the rear portion 243 of the main portion 24. The cross-sectional area of the rear portion 243 of the main portion 24 depends on that of the cable 60, so that it tends to be larger.

Hence, the cross-sectional area of the grip portion 26 is set so that the grip portion 26 is easy to be gripped.

As shown in FIGS. 1 to 4, the mating portion 30 is provided at a front end 201 of the connector body 20 and protrudes forward-diagonally downward. The mating portion 30 can be mated with and separated from an inlet (not shown).

Figure 5:
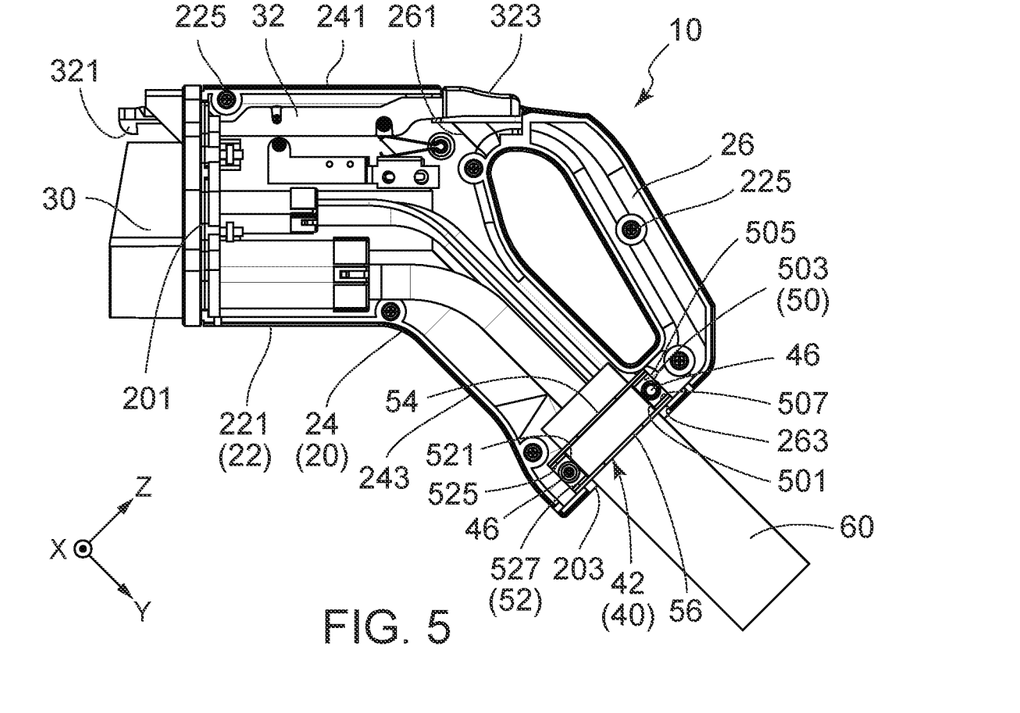
FIG. 5 is another side view showing the charging connector of FIG. 1. In the figure, a cover shell is detached.
Figure 6:
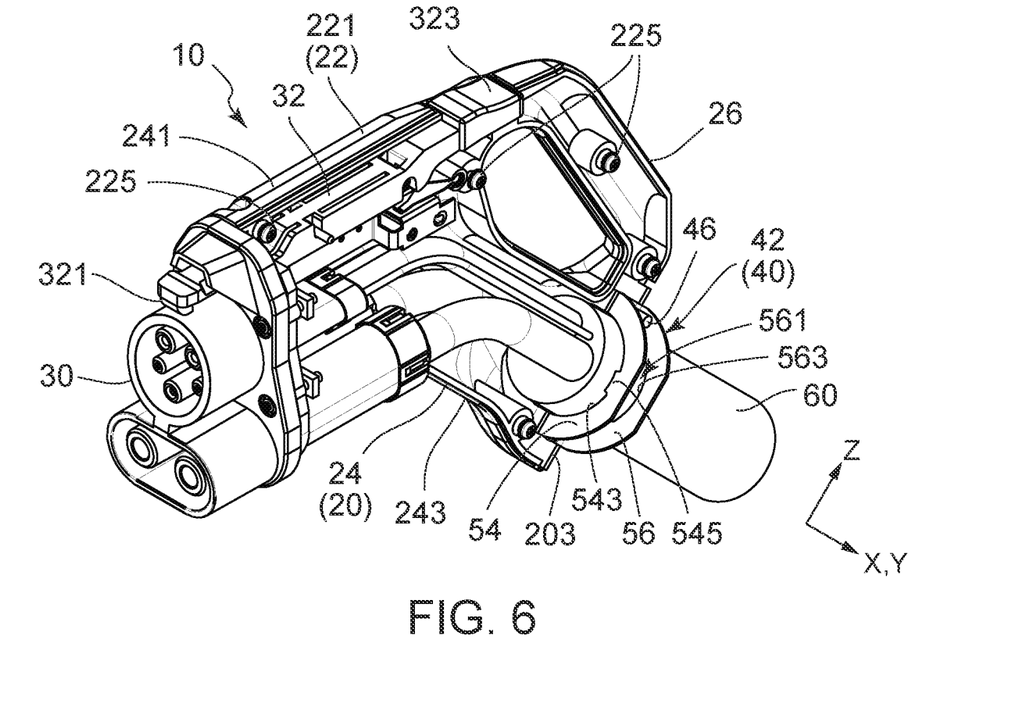
FIG. 6 is another side, perspective view showing the charging connector of FIG. 3. In the figure, the cover shell is detached.

As understood from FIGS. 5 and 6, the latch lever 32 is accommodated in the shell 22 in part. At one end of the latch lever 32, a latch portion 321 is provided. At the other end of the latch lever 32, an operation portion 323 is provided. The latch portion 321 and the operation portion 323 are exposed outside from the shell 22. The latch portion 321 is located approximately upward of the mating portion 30 and protrudes forward-diagonally downward from the front end 201 of the connector body 20. The operation portion 323 is located forward of the grip portion 26.

As understood from FIGS. 5 and 6, when the mating portion 30 is mated with the inlet (not shown), the latch portion 321 of the latch lever 32 is engaged with a lock portion (not shown) provided on the inlet. As a result, the charging connector 10 is prevented from being detached inadvertently from the inlet. Upon operating the operation portion 323 of the latch lever 32, the latch portion 321 separates from the lock portion. As a result, the charging connector 10 can be separated from the inlet.

As shown in FIGS. 5 and 6, in the connector body 20 or the shell 22, a cable clamp 40 is accommodated. The cable clamp 40 is clamped on the cable 60 extending in the front-rear direction in the shell 22. In other words, the cable clamp 40 clamps and holds the cable 60 in the shell 22. The cable clamp 40 is located in the vicinity of a rear end 203 of the main portion 24 of the connector body 20. The location of the cable clamp 40 corresponds to that of the end portion 263 which is one end of the grip portion 26. The cable clamp 40 is located inside the grip portion 26 in part. Since the cable clamp 40 is located in the grip portion 26 in part, it is possible to reduce a size of the rear portion 243 of the main portion 24 and to reduce a whole size of the charging connector 10.

Referring to FIGS. 7 to 10, the cable clamp 40 is provided with a first member 42 and a second member 44. In the present embodiment, the first member 42 and the second member 44 has the same shape as each other. In the following description, the description regarding the first member 42 is applicable to the second member 44. However, the present invention is not limited thereto. The first member 42 and the second member 44 may have different shapes from each other.

Referring to FIGS. 11 to 14, the first member 42 is made of a metal plate and has a first fixed portion 50, a second fixed portion 52, a front plate portion 54 and a rear plate portion 56.

Figure 11:
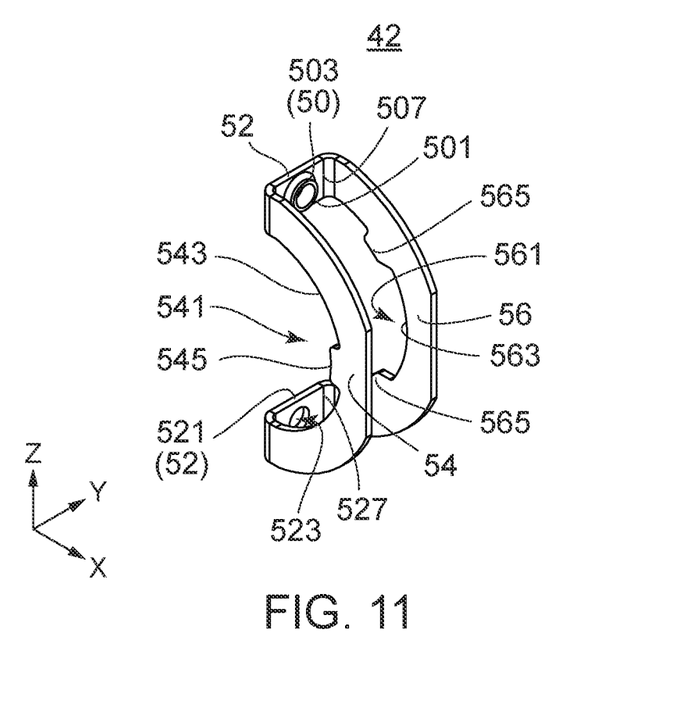
FIG. 11 is a perspective view showing a first member included in the cable clamp of FIG. 7.
Figure 12:
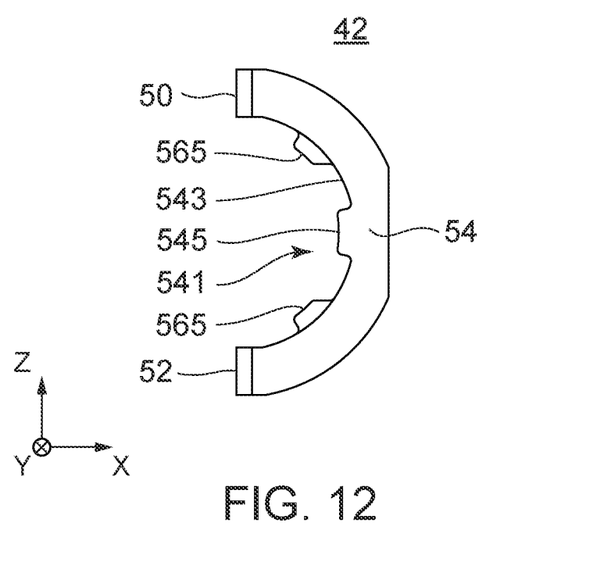
FIG. 12 is a front view showing the first member of FIG. 11.
Figure 13:
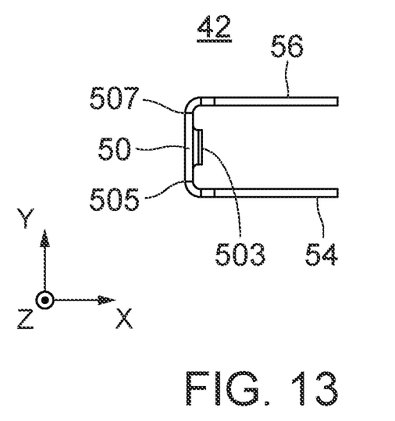
FIG. 13 is a plane view showing the first member of FIG. 11.
Figure 14:
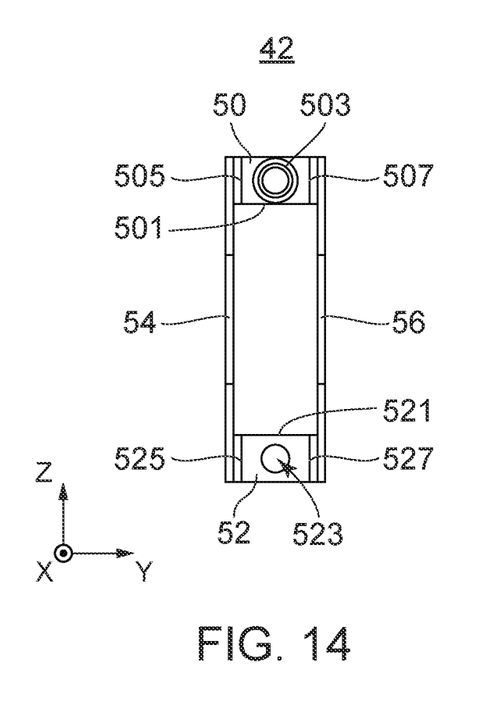
FIG. 14 is a side view showing the first member of FIG. 11.

As shown in FIGS. 11, 13 and 14, in the present embodiment, the first fixed portion 50 and the second fixed portion 52 are rectangular flat plates perpendicular to the lateral direction. In other words, the first fixed portion 50 and the second fixed portion 52 are flat plates extending in a plane parallel to the front-rear direction. However, the present invention is not limited thereto. The first fixed portion 50 and the second fixed portion 52 may have three dimensional shapes.

As shown in FIGS. 11 and 14, the first fixed portion 50 and the second fixed portion 52 are located apart from each other in a first direction perpendicular to the front-rear direction. The first fixed portion 50 and the second fixed portion 52 have facing edges 501 and 521 which face each other. In the present embodiment, the first direction is the Z-direction which is identical with the up-down direction.

As shown in FIGS. 11, 13 and 14, the first fixed portion 50 is formed with a burring portion 503. On an inner side of the burring portion 503, a female screw (not shown) is formed. Moreover, in the second fixed portion 52, a through hole (an unloaded hole) 523 is formed.

As understood from FIGS. 11 to 14, the front plate portion 54 couples a front edge 505 of the first fixed portion 50 and a front edge 525 of the second fixed portion 52 with each other. The front plate portion 54 has a recessed edge 543 defining a recessed portion 541 which receives the cable 60 in part. The recessed edge 543 is contiguous to the facing edges 501 and 502 of both of the first fixed portion 50 and the second fixed portion 52. In the present embodiment, when viewed along the lateral direction, the front plate portion 54 has an approximately half-ring shape.

As understood from FIGS. 11 to 14, the front plate portion 54 extends from the first fixed portion 50 and the second fixed portion 52 in a plane perpendicular to the front-rear direction. In other words, the front plate portion 54 is perpendicular to the first fixed portion 50 and the second fixed portion 52. However, the present invention is not limited thereto. The front plate portion 54 may make an obtuse angle with the first fixed portion 50 and the second fixed portion 52.

As shown in FIGS. 11 to 14, the front plate portion 54 has a single protruding portion 545 on the recessed edge 543. The protruding portion 545 extends in the plane perpendicular to the front-rear direction. However, the present invention is not limited thereto. The front plate portion 54 may not have the protruding portion 545 or may have two or more of the protruding portions 545.

As shown in FIGS. 11 to 14, the rear plate portion 56 is located rearward of and away from the front plate portion 54 in the front-rear direction. The rear plate portion 56 couples a rear edge 507 of the first fixed portion 50 and a rear edge 527 of the second fixed portion 52 with each other. The rear plate portion 56 has a recessed edge 563 defining a recessed portion 561 which receives the cable 60 in part. The recessed edge 563 is contiguous to the facing edges 501 and 502 of both of the first fixed portion 50 and the second fixed portion 52. In the present embodiment, when viewed along the lateral direction, the rear plate portion 56 has an approximately half-ring shape similarly to the front plate portion 54.

As understood from FIGS. 11 to 14, the rear plate portion 56 extends from the first fixed portion 50 and the second fixed portion 52 in a plane perpendicular to the front-rear direction. In other words, the rear plate portion 56 is perpendicular to the first fixed portion 50 and the second fixed portion 52. However, the present invention is not limited thereto. The rear plate portion 56 may make an obtuse angle with the first fixed portion 50 and the second fixed portion 52.

As shown in FIGS. 11 to 14, the rear plate portion 56 has two protruding portions 565 on the recessed edge 563. The protruding portions 565 extend in the plane perpendicular to the front-rear direction. When viewed along the lateral direction, each of the protruding portions 565 does not overlap with the protruding portion 545 of the front plate portion 54. With this structure, the cable clamp 40 can hold the cable 60 stably. However, the present invention is not limited thereto. The rear plate portion 56 may not have the protruding portions 565, or the protruding portion(s) 565 may be one or three or more in number. Moreover, when viewed along the lateral direction, the protruding portions 565 of the rear plate portion 56 may overlap with the protruding portion 545 of the front plate portion 54.

Figure 15:
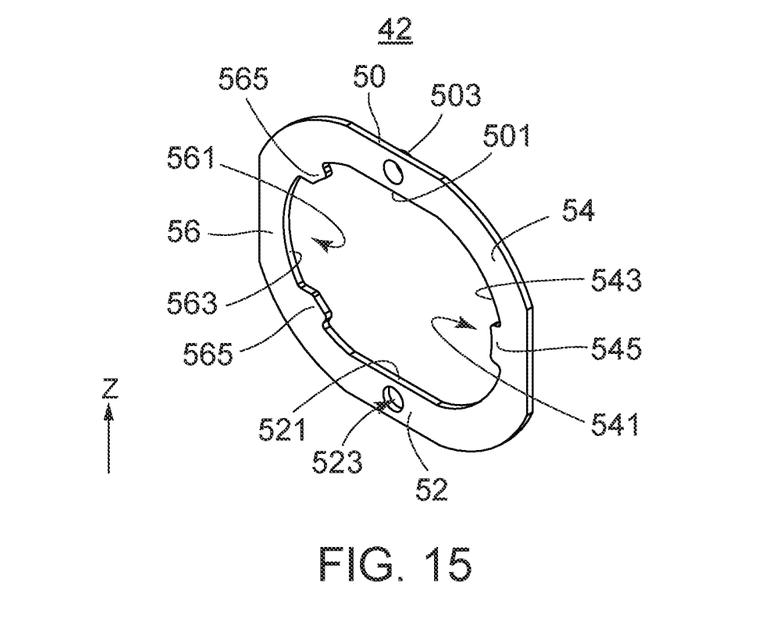
FIG. 15 is a perspective view showing a metal plate to become the first member of FIG. 11.
Figure 16:
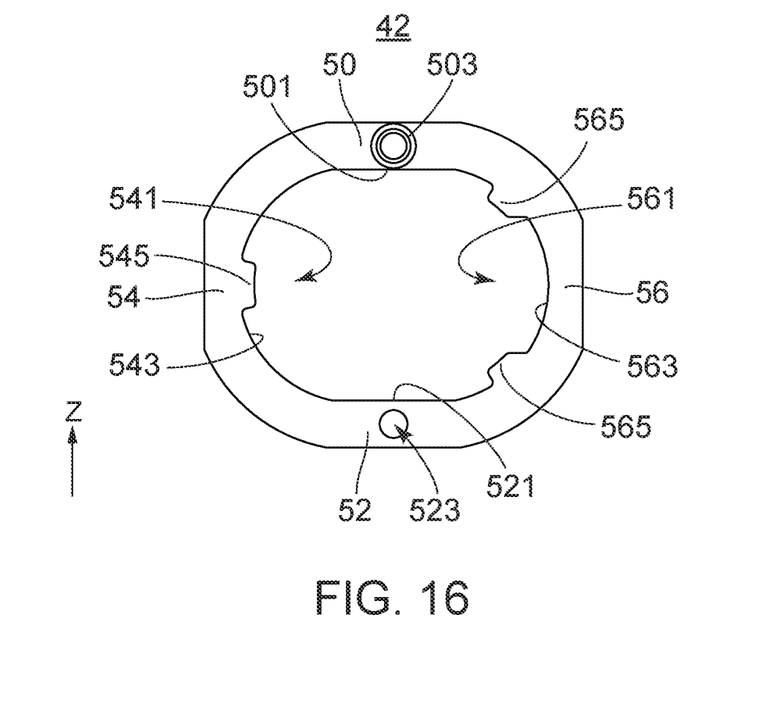
FIG. 16 is a front view showing the metal plate of FIG. 15.

As understood from FIGS. 11 to 16, the first member 42 is made by applying a bending process to a ring-shaped metal plate shown in FIGS. 15 and 16. The ring-shaped metal plate shown in FIGS. 15 and 16 is made by applying a stamping process, a burring process and a threading process to a flat metal plate.

As understood from FIG. 6, the first member 42 and the second member 44 are combined with each other so as to clamp the cable 60 in a second direction perpendicular to both of the front-rear direction and the first direction. In the present embodiment, the second direction is identical with the lateral direction.

As shown in FIGS. 7 to 10, in the present embodiment, the first member 42 and the second member 44 are fixed, so to speak, back to back to each other. In detail, the first fixed portion 50 of the first member 42 is fixed to the second fixed portion 52 of the second member 44, and the second fixed portion 52 of the first member 42 is fixed to the first fixed portion 50 of the second member 44.

As shown in FIGS. 7 to 10, in the present embodiment, the first member 42 and the second member 44 are fixed to each other by use of a pair of screws 46. In detail, one of the screws 46 is inserted into the through hole 523 of the second fixed portion 52 of the first member 42 and engaged with the female screw (not shown) of the burring portion 503 of the first fixed portion 50 of the second member 44. The other of the screws 46 of the pair is inserted into the through hole 523 of the second fixed portion 52 of the second member 44 and engaged with the female screw (not shown) of the burring portion 503 of the first fixed portion 50 of the first member 42. Thus, the first fixed portion 50 and the second fixed portion 52 of the first member 42 are fixed to the second fixed portion 52 and the first fixed portion 50 of the second member 44 by use of the screws 46, respectively. By fixing by use of the screws 46 in this way, tightness of the cable 60 can be adjusted. Accordingly, it is also possible to prevent an excessive force from being applied to the front plate portion 54 of the first member 42 and the rear plate portion 56 of the second member 44. However, the present invention is not limited thereto. The first member 42 and the second member 44 may be fixed to each other by a fixing means other than the screws 46. For example, as the fixing means, the first fixed portion 50 may be provided with a hook portion while the second fixed portion 52 may be provided with a hook receiving portion.

As understood from FIGS. 6 to 9, in a clamped state in which the cable clamp 40 is clamped on the cable 60, the first fixed portion 50 and the second fixed portion 52 of the first member 42 come into contact with and are fixed to the second fixed portion 52 and the first fixed portion 50 of the second member 44, respectively, in the second direction. In the present embodiment, the first member 42 and the second member 44 have the same shape as each other. Accordingly, a combination of them, i.e. the cable clamp 40, has a shape which is rotation symmetry about an axis extending along the front-rear direction. In other words, in the present embodiment, the first member 42 and the second member 44 are fixed to each other so that the combination of them is rotation symmetry about the axis extending along the front-rear direction.

Figure 7:
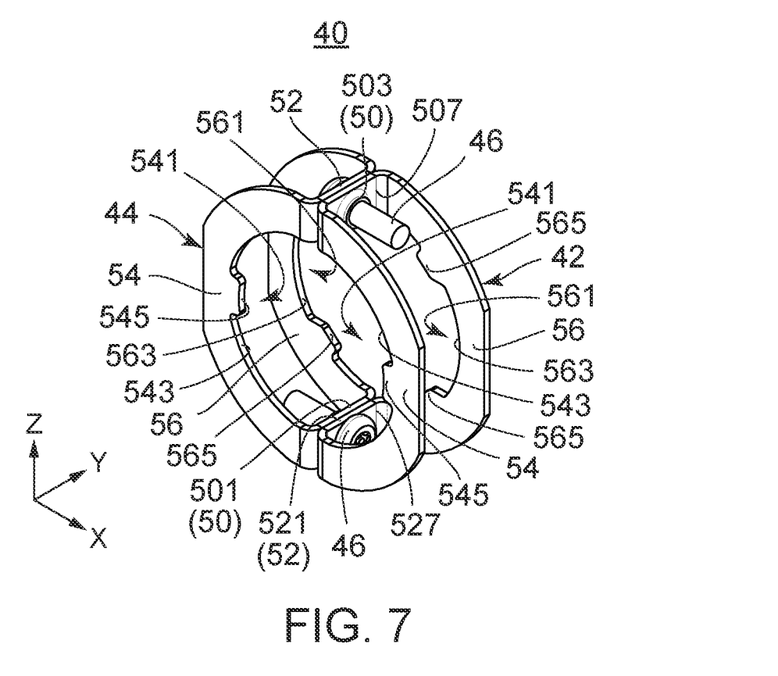
FIG. 7 is a perspective view showing a cable clamp included in the charging connector of FIG. 6.
Figure 8:
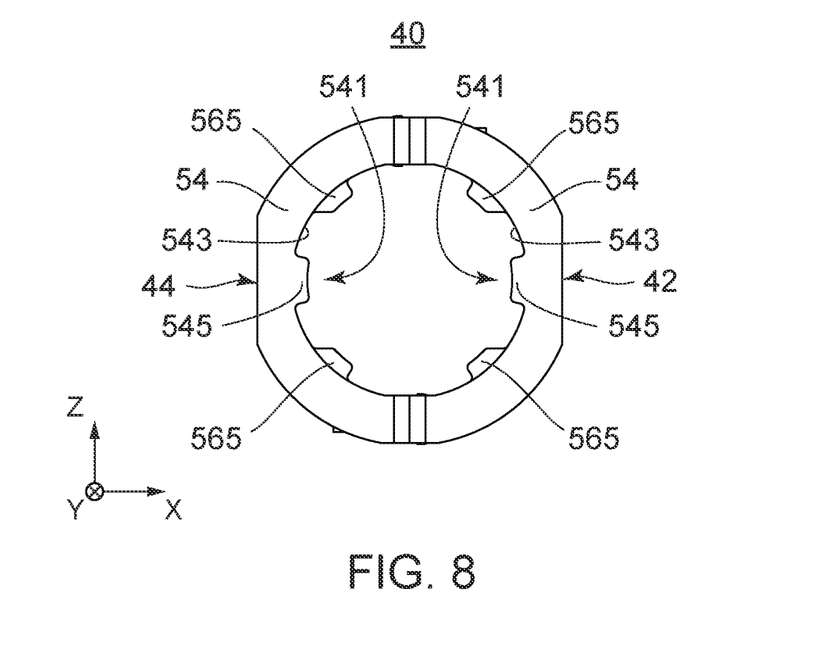
FIG. 8 is a front view showing the cable clamp of FIG. 7.
Figure 9:
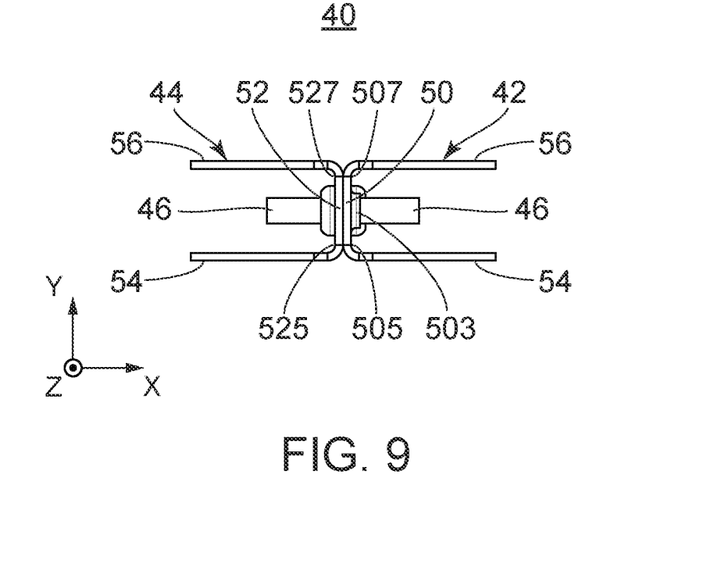
FIG. 9 is a plane view showing the cable clamp of FIG. 7.
Figure 10:
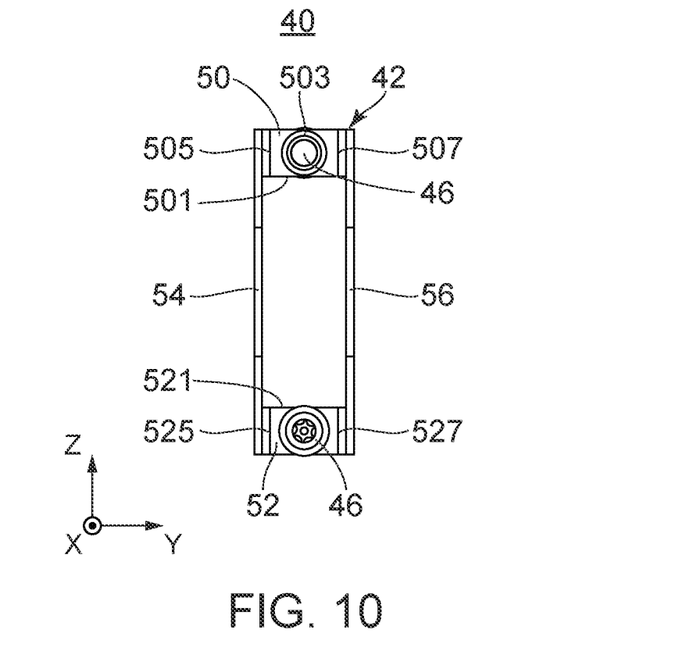
FIG. 10 is a side view showing the cable clamp of FIG. 7.

As understood form FIGS. 6 to 8, in the clamped state, the cable 60 is located, in the second direction, between the front plate portion 54 of the first member 42 and the front plate portion 54 of the second member 44 and between the rear plate portion 56 of the first member 42 and the rear plate portion 56 of the second member 44. Then, the protruding portion 545 of the front plate portion 54 and the protruding portions 565 of the rear plate portion 56 are pressed against a sheath of the cable 60. Thus, the protruding portion 545 and the protruding portions 565 function as clamp portions which are clamped on the cable 60.

As understood from FIGS. 6 to 8, when the cable clamp 40 clamps and holds the cable 60, the front plate portion 54 and the rear plate portion 56 of each of the first member 42 and the second member 44 receive a tensile force mainly in the lateral direction. This force works hardly as a force to deform the front plate portion 54 and the rear plate portion 56 in the front-rear direction. Accordingly, the front plate portion 54 and the rear plate portion 56 are hardly deformed in the front-rear direction even when receiving the force from the cable 60. Thus, since the first member 42 and the second member 44 which are made of the ring-shaped metal plates are combined back to back with each other, the cable clamp 40 according to the present embodiment is hardly deformed when clamping and holding the cable 60. Therefore, a situation that the cable clamp 40 cannot be accommodated in the shell 22 is not occurred either.

Although the specific explanation about the present invention is made above referring to the embodiments, the present invention is not limited thereto but susceptible of various modifications and alternative forms.

Figure 17:
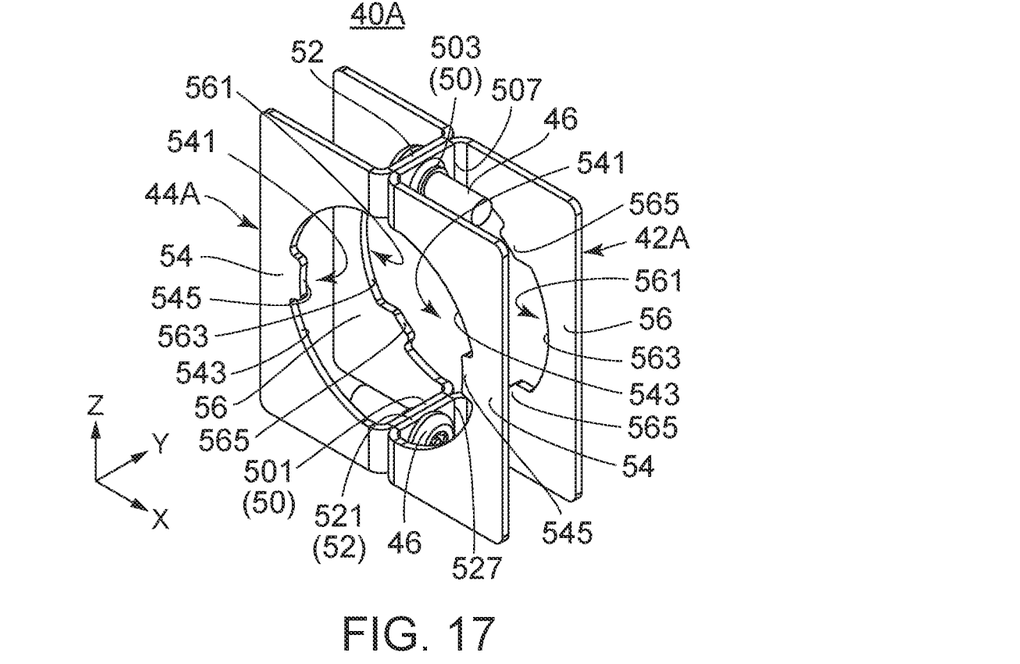
FIG. 17 is a perspective view showing a modified example of the cable clamp shown in FIG. 7.

For example, although the protruding portions 545 and 565 are provided to the front plate portion 54 and the protruding portions 565 in the aforementioned embodiment, the protruding portions 545 and 565 may not be provided to the front plate portion 54 and the rear plate portion 56. In that case, the recessed edge 543 of the front plate portion 54 and the recessed edge 563 of the rear plate portion 56 function as clamp portions which are pressed against the cable 60. Moreover, the protruding portion(s) 545 or 565 may be provided to one of the front plate portion 54 and the rear plate portion 56, and the protruding portion(s) 545 or 565 may be used as the clamp portion(s). In other words, in the present invention, the clamp portion should be provided to at least one of the front plate portion 54 and the rear plate portion 56. Moreover, in the present invention, each of the first member 42 and the second member 44 should be provided with at least one clamp portion. When the protruding portions 545 and 565 are used as clamp portions, the clamp portions should protrude from at least one of the recessed edges 543 and 563 of the front plate portion 54 and the rear plate portion 56 in a plane perpendicular to the front-rear direction. Furthermore, as shown in FIG. 17, each of the front plate portion 54 and the rear plate portion 56 may have an angular C-shape. Also, in this case, a cable clamp 40A is formed by combining a first member 42A and a second member 44A back to back with each other and fixing them to each other.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A cable clamp which clamps and holds a cable extending in a front-rear direction in a shell of a connector, wherein:
the cable clamp comprises a first member and a second member;
each of the first member and the second member is made of a metal plate;
each of the first member and the second member has a first fixed portion, a second fixed portion, a front plate portion, a rear plate portion and a clamp portion;
the first fixed portion and the second fixed portion are located apart from each other in a first direction perpendicular to the front-rear direction;
the first fixed portion and the second fixed portion are perpendicular to a second direction perpendicular to both of the front-rear direction and the first direction;
the front plate portion couples the first fixed portion to the second fixed portion;
the rear plate portion is located rearward of and apart from the front plate portion in the front-rear direction and couples the first fixed portion to the second fixed portion;
the clamp portion is provided on at least one of the front plate portion and the rear plate portion;
in a clamped state that the cable clamp is clamped on the cable, in the second direction perpendicular to both of the front-rear direction and the first direction, the first and second fixed portions of the first member are fixed to the first and second fixed portions of the second member, respectively;
in the clamped state, in the second direction, the cable is located between the front plate portion of the first member and the front plate portion of the second member and between the rear plate portion of the first member and the rear plate portion of the second member; and
in the clamped state, the clamp portion is pressed against the cable.

2. The cable clamp as recited in claim 1, wherein:
each of the front plate portion and the rear plate portion has a recessed edge defining a recessed portion which receives the cable in part;
in each of the first member and the second member, the first and second fixed portions have facing edges which face each other in the first direction, respectively;
in each of the first member and the second member, the recessed edge is contiguous to the facing edges; and
the clamp portion protrudes from the recessed edge of at least one of the front plate portion and the rear plate portion in a plane perpendicular to the front-rear direction.

3. The cable clamp as recited in claim 1, wherein the first and second fixed portions of the first member are fixed to the first and second fixed portions of the second member with screws, respectively.

4. The cable clamp as recited in claim 1, wherein each of the front plate portion and the rear plate portion extends in a plane perpendicular to the front-rear direction.

5. The cable clamp as recited in claim 1, wherein each of the first and second fixed portions extends in a plane parallel to the front-rear direction.

6. The cable clamp as recited in claim 1, wherein:
the first member and the second member have an identical shape with each other; and
the first member and the second member are fixed to each other so that a combination thereof is rotation symmetry about an axis extending along the front-rear direction.

7. A charging connector having a body, wherein:
the charging connector comprises the cable clamp as recited in claim 1, and
the cable clamp is accommodated in the body.

8. The charging connector as recited in claim 7, wherein:
the body has a main portion and a grip portion;

the main portion accommodates an end of the cable when the charging connector is connected to the cable;

the grip portion has a pair of end portions each of which is connected to the main portion; and the cable clamp is located in one of the end portions of the grip portion in part.

\* \* \* \* \*